United States Patent
Belling-Hoffmann et al.

(10) Patent No.: US 12,441,395 B2
(45) Date of Patent: Oct. 14, 2025

(54) METHOD FOR MONITORING AN ELECTRICAL STEERING DEVICE, AND STEERING DEVICE

(71) Applicant: KNORR-BREMSE Systeme für Nutzfahrzeuge GmbH, Munich (DE)

(72) Inventors: Michael Belling-Hoffmann, Renningen (DE); Maximilian Pohlmann, Bruchsal (DE)

(73) Assignee: KNORR-BREMSE Systeme für Nutzfahrzeuge GmbH, Munich (DE)

( * ) Notice: Subject to any disclaimer, the term of this patent is extended or adjusted under 35 U.S.C. 154(b) by 292 days.

(21) Appl. No.: 17/864,640

(22) Filed: Jul. 14, 2022

(65) Prior Publication Data

US 2023/0033322 A1    Feb. 2, 2023

Related U.S. Application Data

(63) Continuation of application No. PCT/EP2021/051626, filed on Jan. 25, 2021.

(30) Foreign Application Priority Data

Feb. 3, 2020    (DE) .................... DE102020102595.5

(51) Int. Cl.
*B62D 5/04*    (2006.01)
*B62D 15/02*    (2006.01)
*G01B 21/22*    (2006.01)

(52) U.S. Cl.
CPC ......... *B62D 5/0487* (2013.01); *B62D 15/021* (2013.01); *G01B 21/22* (2013.01)

(58) Field of Classification Search
CPC .. B62D 5/0487; B62D 15/021; B62D 15/025; B62D 5/0481; G01B 21/22;
(Continued)

(56) References Cited

U.S. PATENT DOCUMENTS

2004/0060206 A1*   4/2004   Ichimura ............... F15B 19/005
                                                                    37/348
2008/0015751 A1    1/2008   Riepold
(Continued)

FOREIGN PATENT DOCUMENTS

CN    202180012554.1    9/2022
DE    102008002699      12/2008
(Continued)

OTHER PUBLICATIONS

Machine Translation of JP2015044479 (Year: 2015).*

*Primary Examiner* — Anne Marie Antonucci
*Assistant Examiner* — Patrick Daniel Mohl
(74) *Attorney, Agent, or Firm* — Friedrich von Rohrscheidt

(57) ABSTRACT

A method for monitoring an electric steering device of a vehicle while the vehicle is driving includes generating a nominal movement direction signal that characterizes a current nominal movement direction of the vehicle and processing the nominal direction movement signal in at least one electronic control device, feeding surroundings data into the at least one electronic control device wherein the surroundings data is generated by a sensor device of the vehicle that scans surroundings of the vehicle touch free, wherein the surroundings data characterizes surroundings of the vehicle and is configured to be processed by a first driver assistance system, wherein the surroundings data facilitates detecting a current actual movement direction of the vehicle.

14 Claims, 1 Drawing Sheet

(58) Field of Classification Search
CPC ... B60W 2420/403; B60W 2050/0295; B60W 2420/408; B60W 2510/202; B60W 2520/00; B60W 2540/18; B60W 40/10; B60W 50/045; B60W 2050/021; B60W 50/04

See application file for complete search history.

(56) References Cited

U.S. PATENT DOCUMENTS

| | | | | |
|---|---|---|---|---|
| 2018/0154932 | A1* | 6/2018 | Rakouth | B62D 1/286 |
| 2018/0329419 | A1 | 11/2018 | Adams | |
| 2019/0329819 | A1* | 10/2019 | Shan | B62D 5/12 |
| 2020/0019160 | A1* | 1/2020 | McArthur | G01S 7/412 |
| 2020/0062292 | A1* | 2/2020 | Shin | B62D 15/021 |
| 2020/0207408 | A1* | 7/2020 | Nakamura | B62D 5/049 |
| 2020/0391790 | A1* | 12/2020 | Kamemura | B62D 5/006 |
| 2021/0354757 | A1* | 11/2021 | Kim | B62D 15/0235 |
| 2022/0363289 | A1* | 11/2022 | Nehmadi | G06V 20/56 |

FOREIGN PATENT DOCUMENTS

| | | | | |
|---|---|---|---|---|
| DE | 102011011120 A1 | | 8/2012 | |
| DE | 102013205018 A1 | | 9/2013 | |
| JP | 2015044479 A | * | 3/2015 | B62D 3/02 |

\* cited by examiner

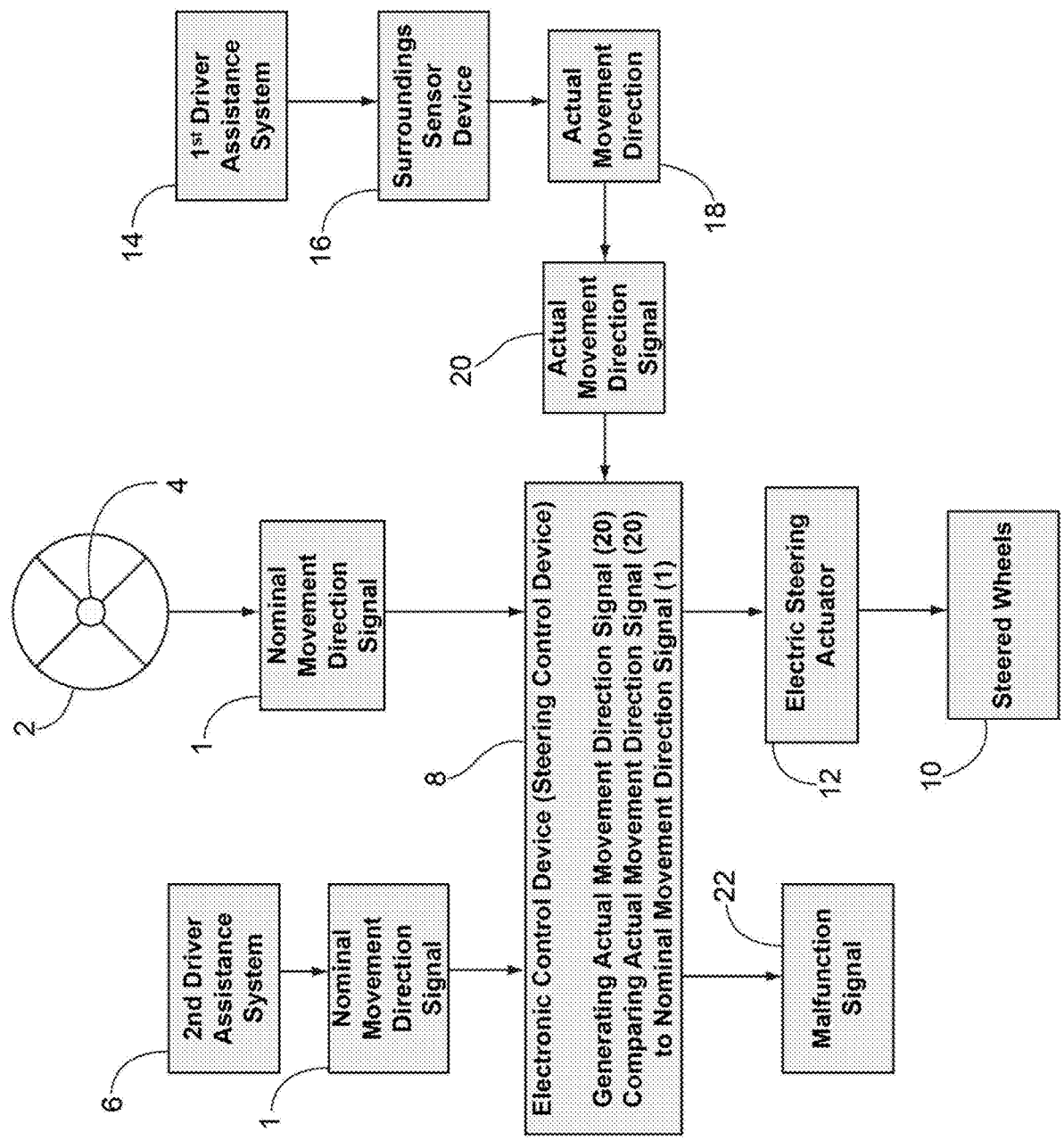

METHOD FOR MONITORING AN ELECTRICAL STEERING DEVICE, AND STEERING DEVICE

RELATED APPLICATIONS

This application is a continuation of International Patent Application PCT/EP2021/051626 filed on Jan. 25, 2021 claiming priority from German Patent Application DE 10 2020 102 595.5 filed on Feb. 3, 2020, both of which are incorporated in their entirety by this reference.

FIELD OF THE INVENTION

The invention relates to a method for monitoring an electrical steering including a device generating a nominal movement direction signal that characterizes a current nominal movement direction of the vehicle and processing the nominal direction movement signal in at least one electronic control device and feeding surroundings data into the at least one electronic control device wherein the surroundings data is generated by a sensor device of the vehicle that scans surroundings of the vehicle touch free. The surroundings data characterizes surroundings of the vehicle and is configured to be processed by a first driver assistance system, and the surroundings data facilitates detecting a current actual movement direction of the vehicle. The method also includes generating an actual movement direction signal by the at least one electronic control device based on the surroundings data wherein the actual movement direction signal characterizes a current actual movement direction of the vehicle, comparing the actual movement direction signal with the nominal movement direction signal in the at least one electronic control device, and generating a malfunction signal in the at least one electronic control device when the actual movement direction signal differs significantly from the nominal movement direction signal wherein the malfunction signal indicates a malfunction of the electronic steering device, otherwise not generating the malfunction signal. The invention also relates to an electric steering device including an electric steering actuator wherein the electric steering device is monitored by the method described supra. The invention also relates to a vehicle or commercial vehicle including the electric steering device described supra.

BACKGROUND OF THE INVENTION

Electric steering devices including electric steering actuators are also being used in systems for partially autonomous driving or fully autonomous driving in order to at least partially automate lateral guidance of the vehicle.

When driving manually a driver operates a motor vehicle with respect to longitudinal and lateral guidance of the vehicle. Even when driver assistance systems support the longitudinal and lateral guidance or in some instances also take over longitudinal and lateral guidance the driver remains responsible for the motor vehicle and has to monitor all essential operating functions.

In an operating mode "partially autonomous or partially automated driving" driver assistance systems are known which warn the driver, e.g., of impending collisions and which may also attempt to avoid such collisions by performing interference. Embodiments of these driver assistance systems are emergency brake assist, lane keep assist, a blind spot warning system, a parking assist and automatic cruise control (ACC) in particular for highway driving.

During "highly automated driving" responsibility transfers to a control system at least during time periods. The vehicle guidance system is then configured to take over guidance of the vehicle completely for a certain time period and, e.g., in a defined environment, e.g., on highways. The driver is then not responsible anymore to monitor the control functions. Since critical situations can still occur when sensors fail or when traffic situations are ambiguous, the system can return the guidance responsibility to the driver. In order to make this possible it has to be assured that the driver can reassume guidance of the motor vehicle in a time window of a few seconds. The operating mode "highly automated driving" is also characterized in that the driver does not have to continuously monitor vehicle guidance at least in a defined time period and in predetermined situations. The driver, however, has to be capable to reassume control of the vehicle in a suitable time period. The operating mode "highly automated driving" can be differentiated from the operating modes "manual driving" and "partially automated driving" in that the vehicle drives fully automatic in the operating mode "highly automated driving" along a track that is entered through a navigation system, wherein the vehicle is automatically accelerated, braked, and steered by an electronic system.

Highly autonomous driving (HAD) thus requires knowing the surroundings of the vehicle. Thus, the surroundings are scanned or captured by one or plural sensors like radar, lidar, camera, ultrasound sensors or similar sensors that are known in the art. The sensor measurements in combination with signal processing methods that are also known in the sit detect an arrangement of objects in the surroundings. The arrangement indicates that the surroundings cannot be traveled by the vehicle in a particular section, and thus states the position of the object. Additionally, the type or kind of objects is detected, thus whether these objects are pedestrians, vehicles, lane boundaries, traffic lights, and the like. The detected arrangements and types of objects are used to generate an environment which includes information or data regarding the arrangement of objects in the surroundings, thus in particular of the sections of the surroundings that are occupied by objects and a type of the objects.

Electrical control devices including electric steering actuators are thus either being used as an auxiliary steering device where the electric steering actuator supports a mechanical steering device with a mechanical connection between a steering wheel and steered wheels of the vehicle or as a fully electric steering device where the electric steering actuator exclusively controls or regulates steered wheels of the vehicle according to steering commands.

A steering device of the type recited supra has to be continuously monitored in particular during partially autonomous driving with respect to a correct function of the steering device in order to prevent undesirable steering interference, non-occurring steering interference in spite of existing steering command or incorrect steering interference.

The electric steering device can be monitored, e.g., by redundant steering wheel angle sensors whose signals are then plausibility checked in redundant micro controllers which monitor each other. Providing redundant components in the steering device in order to perform error detection, however, comes with complexity and costs.

BRIEF SUMMARY OF THE INVENTION

Thus, it is an object of the invention to provide a simple method for monitoring an electric steering device. The object is also achieved by an electric steering device that is monitored by the method and a vehicle that includes the electric steering device.

The object is achieved by the characterizing features of the following:
1. A device generating a nominal movement direction signal that characterizes a current nominal movement direction of the vehicle and processing the nominal direction movement signal in at least one electronic control device and feeding surroundings data into the at least one electronic control device wherein the surroundings data is generated by a sensor device of the vehicle that scans surroundings of the vehicle touch free. The surroundings data characterizes surroundings of the vehicle and is configured to be processed by a first driver assistance system, and the surroundings data facilitates detecting a current actual movement direction of the vehicle. The method also includes generating an actual movement direction signal by the at least one electronic control device based on the surroundings data wherein the actual movement direction signal characterizes a current actual movement direction of the vehicle, comparing the actual movement direction signal with the nominal movement direction signal in the at least one electronic control device, and generating a malfunction signal in the at least one electronic control device when the actual movement direction signal differs significantly from the nominal movement direction signal wherein the malfunction signal indicates a malfunction of the electronic steering device, otherwise not generating the malfunction signal.
2. The electric steering device is switched off when the safety measure is performed.
3. The electric steering device is configured fully electric, wherein an electric steering actuator of the electric steering device exclusively drives the steered wheels of the vehicle according to a steering command.

Advantageous embodiment of the invention are stated in the following:
1. The nominal movement direction signal is generated by a steering wheel angle sensor or a steering wheel moment sensor that cooperates with a steering wheel as a function of an actuation of the steering wheel.
2. The nominal movement direction signal is generated by a second driver assistance system.
3. The second driver assistance system partially autonomously or autonomously engages a drive or a braking device or the electric steering device or a signaling device of the vehicle or warns the driver of the vehicle through a man machine interface shortly before or during critical situations.
4. The second driver assistance system performs a function that differs from monitoring the electric steering device.
5. The second driver assistance system is formed by at least one of the following driver assistance systems: an adaptive cruise control (ACC), an automatic distance warning system, an emergency braking assistant, a lane keeping assistant, a lane detection system, a lane departure warning system, a lane change assistant, a turning assistant, a system configured to control or regulate a group of electronically coupled vehicles (platoon), a blind spot monitoring system, a traffic sign recognition system, a parking assistant, a system configured for autonomous or partially-autonomous driving.
6. The first driver assistance system partially autonomously or autonomously engages a drive and/or a brake device or the electric steering device or a signaling device of the vehicle or warns the driver of the vehicle through a human-machine interface shortly before or during critical situations.
7. The first driver assistance system performs a function that deviates from monitoring the electric steering device.
8. The first driver assistance system is formed by at least one of the following driver assistance systems: an adaptive cruise control (ACC), an automatic distance warning system, an emergency braking assistant, a lane keeping assistant, a lane detection system, a lane departure warning system, a lane change assistant, a turning assistant, a system configured to control or regulate a group of electronically coupled vehicles (platoon), a blind spot monitoring system, a traffic sign recognition system, a parking assistant, a system configured for autonomous or partially-autonomous driving.
9. At least one safety measure is performed if the malfunction signal is generated.
10. The electric steering device is configured as an auxiliary steering device in which an electric steering actuator supports a mechanical steering device including a mechanical connection between a steering wheel and steered wheels of the vehicle.
11. The vehicle is braked to a stop by an operating brake when the safety measure is performed.
12. A parking brake is activated when the stop of the vehicle is detected.
13. At least one of the following sensors is used as the surroundings sensor of the surroundings sensor device: a video camera, a rear view camera, a radar sensor, a lidar sensor, an ultrasound sensor, or a dashcam.
14. Exceeding a predetermined difference between the actual movement direction signal and the nominal movement direction signal constitutes the significant deviation of the actual movement direction signal from the nominal movement direction signal.
15. The electronic control device includes a steering control device of the electric steering device.
16. An electric steering device including the electric steering actuator configured to perform the method described supra.
17. A vehicle or commercial vehicle including the electric steering device described supra.

The object is achieved by a method for monitoring an electric steering device of a vehicle while the vehicle is driving, the method comprising:
a) generating a nominal movement direction signal that characterizes a current nominal movement direction of the vehicle and processing the nominal direction movement signal in at least one electronic control device; and
b) feeding surroundings data that is generated by a sensor device of the vehicle that scans surroundings of the vehicle touch free,
b1) wherein the surroundings data characterizes surroundings of the vehicle and is configured to be processed by a first driver assistance system,
b2) wherein the surroundings data facilitates a detection of a current actual movement direction of the vehicle into the at least one electronic control device;
c) generating an actual movement direction signal by the at least one electronic control device based on the surroundings data wherein the actual movement direction signal characterizes a current actual movement direction of the vehicle;

d) comparing the actual movement direction signal with the nominal movement direction signal in the at least one electronic control device; and e) generating a malfunction signal in the at least one electronic control device when the actual movement direction signal differs significantly from the nominal movement direction signal wherein the malfunction signal indicates a malfunction of the electronic steering device, otherwise not generating the malfunction signal.

Put differently, the nominal movement direction signal that is generated, e.g., by a steering wheel angle sensor or steering wheel moment sensor that cooperates with a steering wheel of the vehicle as a function of an actuation of the steering wheel and/or by a second driver assistance system is compared with the actual movement direction signal that comes from a surroundings sensor device of the vehicle which is actually part of the first driver assistance system which performs, e.g., a function that differs from monitoring the electric steering device. Consequently, the invention uses an existing surroundings sensor device of at least one first driver assistance system which is typically already provided in current vehicles so that the existing surroundings sensor device can be used according to the invention to perform the comparison to monitor the electric steering device.

If the result of the comparison indicates that the actual movement direction signal differs significantly from the nominal movement direction signal, the malfunction signal is generated that indicates a malfunction of the electric steering device and otherwise no malfunction signal is generated when there is no malfunction. The malfunction signal can be any signal that characterizes a malfunction of the electric steering device, in particular a warning signal that controls a warning device and/or a control signal that controls a device of the vehicle in order to perform at least one safety measure which either compensates for the malfunction of the electric steering device or reduces or eliminates an impact of the electric steering device upon the steering of the vehicle.

The method according to the invention uses surroundings data captured by a surroundings sensor device of a first driver assistance system that is already provided in the vehicle not only for a processing in the first driver assistance system so that the surroundings data is additionally used outside of the first driver assistance system for detecting a malfunction of the electric steering device advantageously using the surrounding sensor device in a dual function. This saves additional components that are typically used to detect malfunctions of the electric steering device.

The electric steering device can be provided with or without a continuous mechanical connection between the steering wheel and a steering transmission. The electric steering device can include an electronic steering control device that receives control commands and implements the control commands in the electric steering actuator. Alternatively, the control commands can also be feed directly into the electric steering actuator, e.g., by an electronic control device.

As stated supra the electric steering device can be an auxiliary steering device where the electric steering actuator supports a mechanical steering device that includes a mechanical connection between a steering wheel and steered wheels of the vehicle or an exclusively electric steering device where the electric steering actuator exclusively controls or regulates steered wheels of the vehicle according to a steering command at the steering wheel.

Surroundings data is data relating to surroundings of the vehicle and in particular to objects arranged in the surroundings of the vehicle like, e.g., objects located below, in front, at a side and/or behind the vehicle, the objects including obstacles, persons or vehicles.

The clause wherein surroundings data provided by the surroundings sensor device enable detecting a current actual movement direction of the vehicle means that the surroundings sensor device is capable in principle to detect a current movement direction and/or a change of the current movement direction of the vehicle, e.g., by reference to at least one stationary reference object in surroundings of the vehicle like, e.g., bridge pillars, traffic signs, traffic light posts, light posts, and the like.

A significant deviation of the actual movement direction signal from the nominal movement direction signal is in particular exceeding a predetermined difference between the actual movement direction signal and the nominal movement direction signal.

The features of the described above in 1 to 17 define advantageous embodiments and improvement upon the invention defined supra.

According to an advantageous embodiment the nominal movement direction signal is generated by a steering wheel angle sensor or steering wheel moment sensor that cooperates with the steering wheel of the vehicle so that the nominal movement direction signal is generated as a function of an actuation of the steering wheel.

Alternatively, or additionally the nominal movement direction signal can be generated by a second driver assistance system.

The second driver assistance system can engage a drive and/or a brake device and/or the electric steering device and/or a signaling device of the vehicle partially autonomously or autonomously and/or warn the driver of the vehicle through a man machine interface shortly before or during critical situations.

In particular the second driver assistance system can perform a function that differs from monitoring the electric steering device.

The second driver assistance system can be formed, e.g., by at least one of the following driver assistance systems: an adaptive cruise control (ACC), an automatic distance warning system, an emergency brake assistant, a lane keep assist, a lane detection system, a lane departure warning system, a lane change assistant, a turning assistant, system for controlling or regulating a vehicle group including electronically coupled vehicles (platoon), a blind spot monitoring system, a traffic sign detection system, a parking assist, and a system for autonomous or partially autonomous driving.

By the same token the first driver assistance system that differs from the second driver assistance system can engage a drive and/or a brake device and/or the electric steering device and or a signaling device of the vehicle and/or can warn the driver of the vehicle through a r an machine interface shortly before or during critical situations.

The first driver assistance system can perform, e.g., a function that differs from monitoring the electric steering device.

In particular the first driver assistance system can be formed by at least one of the following driver assistance systems: an adaptive cruise control (ACC), an automatic distance warning system, an emergency braking assistant, a lane keep assistant, a lane detection system, a lane departure warning system, a lane change assistant, a turning assistant, a system for controlling or regulating a vehicle group made from electronically coupled vehicles, (platoon), a blind spot monitoring system, a traffic sign detection system, a parking assistant, a system for autonomous or partially autonomous driving.

According to the Society of Automotive Engineers (SAE) J3016, the degrees of automation during driving are summarized in 5 stages. The designation "system" thus either stands for a driver assistance system, a combination of individual driver assistance systems or a completely autonomous drive-, braking-, and steering system. The degree of automation is becoming more comprehensive, it starts with systems or inform or warn the driver (level 0), continues with systems that take over either longitudinal guidance or lateral guidance of the vehicle wherein the driver is always responsible for monitoring the surroundings or step in as a backup (level 1). More comprehensive automation is provided by level 2 systems which already take over longitudinal and transversal guidance of the vehicle, monitoring the surroundings and wherein the backup level still remains with the driver (level 2). Level 3 systems automatically guide the vehicle without the driver monitoring the surroundings, wherein the driver, however, the driver still has to function at a back-up level. In level 4 the system is fully responsible for vehicle guidance and has to provide system inherent back-up solutions when a failure occurs. Level 5 differs from level 4 only in that the automated vehicle guidance has to function under all conditions whereas this is limited to selective situations in level 4.

The system for partially autonomous or autonomous driving recited supra is a system whose operations are performed at least at level 2 or at a higher level according to SAE J 3016 recited supra.

According to an advantageous embodiment a safety measure is performed when a malfunction signal is generated. As recited supra the safety measure can then either compensate the mal unction of the electric steering device or reduce the influence of the electric steering device upon the steering of the vehicle or completely eliminate the influence.

When the electric steering device is, e.g., an auxiliary steering device where the electric steering actuator supports a mechanical steering device including a mechanical connection between a steering wheel and steered wheels of the vehicle, the electric steering device is advantageously switched off as a safety measure so that the electric steering device does not influence the steering of the vehicle anymore (fall silent).

Alternatively, when the electric steering device is provided exclusively electric without a mechanical connection between the steering wheel and the steering transmission so that the electric steering actuator exclusively steers or regulates steered wheels of the vehicle according to the steering command, then the vehicle is braked to a stop, e.g., as a safety measure using an operating brake of the vehicle. This does not immediately eliminate an influence of the electric steering device that has proven defective upon steering properties of the vehicle but this is performed after the complete stop of the vehicle caused by the automatic operating braking. According to an advantageous embodiment a parking brake of the vehicle is activated when a stopping of the vehicle is detected so that a safe condition of the vehicle is established.

According to another advantageous embodiment at least one of the following sensors is used as a surroundings sensor of the surroundings sensor device: a video camera, a rearview camera, a radar sensor, a lidar sensor, an ultrasound sensor, or a dash cam.

The electronic control device that performs the comparison and that generates the malfunction signal is advantageously formed by a steering control system of the electric steering device. Alternatively, the electronic control device can be a stand-alone control device or can be formed by any other control device. Furthermore, the electronic control device can form no component of the first driver assistance system and/or the second driver assistance system, or can form a component of the first driver assistance system and/or of the second driver assistance system.

The invention also relates to an electric steering device including an electric steering actuator that is monitored by the method described supra or a vehicle, in particular a commercial vehicle with the electric steering device of the type recited supra.

BRIEF DESCRIPTION OF THE DRAWINGS

The invention is now described based on an advantageous embodiment with reference to a single drawing FIGURE. The drawing FIGURE shows a flow diagram of the method for monitoring an electric steering device of a vehicle while the vehicle is driving according to an advantageous embodiment of the invention.

DETAILED DESCRIPTION OF THE INVENTION

The drawing FIGURE shows a flow diagram of a method for monitoring an electric steering device of a vehicle while the vehicle is driving.

Initially a nominal movement direction signal 1 is generated that characterizes a current nominal movement direction of the vehicle. The nominal movement direction signal characterizes a nominal movement direction of the vehicle in which the vehicle shall move based on a current steering command. Thus, the steering command can include a movement direction that coincides with a current movement path of the vehicle (maintain existing steering angle) or a movement direction that differs from tine current movement direction of the vehicle (adjust existing steering angle).

The nominal movement direction signal 1 is generated, e.g., by a steering wheel angle sensor or a steering wheel moment sensor 4 that cooperates with a steering wheel 2 of the vehicle as a function of an actuation of the steering wheel 2 by the driver of the vehicle. Alternatively, or additionally the nominal movement direction signal can be generated by a system for autonomous or partially autonomous driving 6 which is designated in the drawing figures as "autopilot".

The nominal movement direction signal 1 is then fed to an electronic control device 8 which is formed, e.g., by an electronic steering control unit of the electric steering device.

An electric steering device is, e.g., a fully electric steering device (steer by wire) that does not include a mechanical connection between the steering wheel 2 and steered wheels 10. A steering wheel angle sensor or steering wheel moment sensor 4 is arranged at the steering wheel 2 and feeds the nominal movement direction signal 1 into the electronic control device 8 as a function of an actuation of the steering wheel 2 wherein the electronic control device then controls an electric steering actuator 12 as a function of the nominal movement direction signal 1 wherein the electric steering actuator controls or regulates the steered wheels 10 according to a steering command signal. The steering command signal can also be generated by a second driver assistance system 6 like, e.g., a system for partially autonomous or fully autonomous driving instead of being generated by the steering wheel 2 or in addition to being generated by the steering wheel 2.

Alternatively, the electric steering device can also be an electrical auxiliary steering device where the electric steering actuator 12 supports a mechanical steering device with a mechanical connection between the steering wheel 2 and the steered wheels 10 of the vehicle by applying a steering moment upon the mechanical connection wherein the steering moment can also be generated independently from an actuation from the steering wheel 2. The electric steering actuator 12 is thus in turn controlled by the electronic control device 8 which receives the nominal movement direction signal, e.g., from a driver assistance system like, e.g., a lane keeping assistant. In both cases the nominal movement direction signal 1 is processed in the electronic control device 8 and thereafter the electric steering actuator is controlled accordingly which then deflects the steered wheels 10 according to the nominal movement direction signal 1.

A first driver assistance system 14 is arranged on the vehicle and formed, e.g., by an adaptive cruise control (ACC). The first driver assistance system 14 includes a surroundings sensor device 16, thus, e.g., configured as a radar sensor that is arranged at the front of the vehicle wherein the radar sensor delivers a radar signal which provides information relating to a distance, a relative velocity and, e.g., also a relative acceleration of the vehicle (surroundings data) with reference to a preceding vehicle by processing in an electronic ACC control unit and which initiates in particular automatic braking as required, this means, e.g., when a velocity based minimum distance from the preceding vehicle is undercut. ACC systems of this type are well known in the art and therefore do not need to be described in further detail.

The surroundings sensor device 16 that is actually associated with the first driver assistance system or included therein and that is, e.g., configured as the radar sensor is also capable to detect a current actual movement direction 18 of the vehicle and/or a change of the current actual movement direction 18 by processing the radar signals of the radar sensor 16 through a direction detection algorithm implemented in the electronic control system 8.

Using the direction detection algorithm an actual movement direction signal 20 is generated in the electronic control device 8 that characterizes the current actual movement direction of the vehicle. The actual movement direction signal 20 is then compared in the electronic control device with the nominal movement direction signal 1 that is also fed to the electronic control device 8 as recited supra.

When this comparison yields that a significant deviation of the actual movement direction signal 20 from the nominal movement direction signal 1 is present, a malfunction signal 22 is generated which characterizes a malfunction of the electric steering device, otherwise no malfunction signal is generated. The significant deviation indicates that the nominal movement direction signal 1 was not implemented by the electric steering device correctly.

A significant deviation of the actual movement direction signal 20 from the nominal movement direction signal 1 is indicated in particular by exceeding a predetermined difference between the actual movement direction signal 20 and the nominal movement direction signal 1.

Put differently the nominal movement direction signal 1 is compared to the actual movement direction signal 20 that comes from the surroundings sensor device 16, which actually forms a portion of the first driver assistance system 14.

The first driver assistance system 14 implemented, e.g., as an ACC system, however performs a function that differs from monitoring the electric steering device. Consequently, the invention uses the radar sensor 16 of the first driver assistance system 14 to monitor the function of the electric steering device my performing the comparison recited supra.

If the comparison yields that a significant deviation of the actual movement direction signal 20 from the nominal movement direction signal 1 is detected the malfunction signal 22 is generated which characterizes a malfunction of the electric steering device, and otherwise no malfunction signal is generated when no malfunction is present.

The malfunction signal 22 can be any signal that characterizes a malfunction of the electric steering device, in particular a warning signal which controls a warning device and/or a control signal which controls any piece of equipment in the vehicle in order to perform, e.g., at least one safety measure, which either compensates the malfunction of the electric steering device or reduces or eliminates the influence of the electric steering device upon the steering of the vehicle.

In an advantageous embodiment the safety measure is performed when the malfunction signal 20 is generated. This safety measure can either compensate the malfunction of the electric steering device or reduce or eliminate the influence of the electric steering device upon the steering of the vehicle.

When the electric steering device is configured fully electric without the mechanical connection between the steering wheel 2 and the steered wheels 10 (steer by wire) the safety measure may be performed as an automatic braking of the vehicle to a stop executed by an operating brake of the vehicle. This does not immediately eliminate the influence of the electric steering device that has been determined as defective upon steering properties of the vehicle, but the influence is eliminated after the stop of the vehicle executed by the automatic operating braking. According to an advantageous embodiment a parking brake of the vehicle is activated when the stop of the vehicle is detected in order to establish a safe condition of the vehicle.

When the electric steering device is configured as an electric auxiliary steering device as described supra, the auxiliary electric steering device is switched off as a safety measure so that the electric auxiliary steering device does not impact the steering anymore (fall silent).

The electronic control device that that performs the comparison, generates the malfunction signal 22 and initiates the respective safety measure as required is advantageously formed by the steering control unit of the electric steering device. Alternatively, the electronic control device 8 can also be a stand along control unit or can be formed by any other control unit.

The method will now be described with reference to advantageous embodiments.

Embodiment 1: When a vehicle, with purely electric steering (drive by wire) is to be driven around a turn, e.g., by the driver operating the steering wheel 2, the driver predetermines the nominal movement direction signal 1 by the steering movement at the steering wheel 2. Simultaneously the radar sensor 16 of the first driver assistance system 14 detects the actual movement direction 18 so that the actual movement direction signal 20 is generated in the electronic control device 8 and compared to the nominal movement direction signal 1. If this comparison yields a significant deviation this indicates a malfunction of the electric steering device so that the malfunction signal 22 is subsequently generated.

The malfunction signal 22 initiates an automat e braking of the vehicle using the operating brake to achieve a stop of the vehicle as a safety measure. When the stop of the vehicle is detected the parking brake of the vehicle is activated in order to establish a safe condition of the vehicle. The reason for this measure is that the vehicle with the defective electric steering device cannot be steered anymore and therefore has to be put into a safe condition as quickly as possible.

Embodiment 2: When a vehicle with an electric auxiliary steering device is to run straight in a straight lane controlled by a first driver assistance system 6, e.g., a lane keeping assistant, the first driver assistance system 6 predetermines the nominal movement direction signal 1. Simultaneously the radar sensor 16 of the first driver assistance system 14 detects the actual movement direction 18 wherein the actual movement signal 20 is then generated in the electronic control device 8 and compared with the nominal movement direction signal 1. If this comparison yields a significant deviation, this indicates that the vehicle has departed unintentionally from its straight movement path that is predetermined by the first driver assistance system 6, which indicates a malfunction of the electric steering device when a malfunction of the lane keeping assistant can be excluded, e.g., by a test. Therefore the malfunction signal is generated.

The malfunction signal initiates, e.g., a complete shutdown of the electrical auxiliary steering device as a safety measure (fall silent). Namely the driver can still keep the vehicle in the straight lane by the mechanical connection between the steering wheel 2 and the steered wheels 10 that is not influenced by the malfunction so that no dangerous situation is created.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS 1 nominal movement direction signal
2 steering wheel
4 steering wheel angle- or steering wheel moment sensor
6 second driver assistance system
8 electronic control device
10 steered wheel
12 electric steering actuator
14 first driver assistance system
16 surroundings sensor device
18 actual movement direction
20 actual movement direction signal
22 malfunction signal

What is claimed is:

1. A method for monitoring an electric steering device of a vehicle while the vehicle is driving, the method comprising;
generating a nominal movement direction signal by a driver steering wheel angle sensor or a driver steering wheel torque sensor that cooperates with a driver steering wheel of the vehicle as a function of a direct manual actuation of the driver steering wheel by a driver of the vehicle, wherein the nominal movement direction signal characterizes a current nominal movement direction of the vehicle and processing the nominal direction movement signal in at least one electronic control device;
feeding surroundings data into the at least one electronic control device wherein the surroundings data is generated by a sensor device of the vehicle that scans surroundings of the vehicle touch free,
wherein the surroundings data characterizes surroundings of the vehicle and is configured to be processed by a first driver assistance system,
wherein the surroundings data facilitates detecting a current actual movement direction of the vehicle;
generating an actual movement direction signal by the at least one electronic control device based on the surroundings data wherein the actual movement direction signal characterizes a current actual movement direction of the vehicle;
comparing the actual movement direction signal with the nominal movement direction signal in the at least one electronic control device; and
generating a malfunction signal in the at least one electronic control device when the actual movement direction signal differs from the nominal movement direction signal by a predetermined amount wherein the malfunction signal indicates a malfunction of the electronic steering device, otherwise not generating the malfunction signal,
wherein at least one safety measure is performed if the malfunction signal is generated,
wherein the electric steering device is configured as an auxiliary steering device in which an electric steering actuator supports a mechanical steering device including a mechanical connection between a steering wheel and steered wheels of the vehicle. and
wherein the electric steering device is switched off when the safety measure is performed.

2. The method according to claim 1, wherein the nominal movement direction signal is additionally generated by a second driver assistance system.

3. The method according to claim 2, wherein the second driver assistance system partially autonomously or autonomously engages a drive or a braking device or the electric steering device or a signaling device of the vehicle or warns the driver of the vehicle through a man machine interface before or during critical situations.

4. The method according to claim 2, wherein the second driver assistance system performs a function that differs from monitoring the electric steering device.

5. The method according to claim 2, wherein the second driver assistance system is formed by at least one of the following driver assistance systems: an adaptive cruise control, an automatic distance warning system, an emergency braking assistant, a lane keeping assistant, a lane detection system, a lane departure warning system, a lane change assistant, a turning assistant, a system configured to control or regulate a group of electronically coupled vehicles, a blind spot monitoring system, a traffic sign recognition system, a parking assistant, or a system configured for autonomous or partially-autonomous driving.

6. The method according to claim 1, wherein the first driver assistance system partially autonomously or autonomously engages a drive and/or a brake device or the electric steering device or a signaling device of the vehicle or warns the driver of the vehicle through a human-machine interface before or during critical situations.

7. The method according to claim 6, wherein the first driver assistance system performs a function that deviates from monitoring the electric steering device.

8. The method according to claim 6, wherein the first driver assistance system is formed by at least one of the following driver assistance systems: an adaptive cruise control, an automatic distance warning system, an emergency braking assistant, a lane keeping assistant, a lane detection system, a lane departure warning system, a lane change assistant, a turning assistant, a system configured to control or regulate a group of electronically coupled vehicles, a blind spot monitoring system, a traffic sign recognition system, a parking assistant, or a system configured for autonomous or partially-autonomous driving.

9. The method according to claim 1, wherein at least one of the following sensors is used as the surroundings sensor of the surroundings sensor device: a video camera, a rear view camera, a radar sensor, a lidar sensor, an ultrasound sensor, or a dashcam.

10. The method according to claim 1, wherein the electronic control device includes a steering control device of the electric steering device.

11. An electric steering device including the electric steering actuator configured to perform the method according to claim 1.

12. A vehicle or commercial vehicle including the electric steering device according to claim 11.

13. A method for monitoring an electric steering device of a vehicle while the vehicle is driving, the method comprising:

generating a nominal movement direction signal by a driver steering wheel angle sensor or a driver steering wheel torque sensor that cooperates with a driver steering wheel of the vehicle as a function of a direct manual actuation of the driver steering wheel by a driver of the vehicle, wherein the nominal movement direction signal characterizes a current nominal movement direction of the vehicle and processing the nominal direction movement signal in at least one electronic control device;

feeding surroundings data into the at least one electronic control device wherein the surroundings data is generated by a sensor device of the vehicle that scans surroundings of the vehicle touch free, wherein the surroundings data characterizes surroundings of the vehicle and is configured to be processed by a first driver assistance system, wherein the surroundings data facilitates detecting a current actual movement direction of the vehicle;

generating an actual movement direction signal by the at least one electronic control device based on the surroundings data wherein the actual movement direction signal characterizes a current actual movement direction of the vehicle;

comparing the actual movement direction signal with the nominal movement direction signal in the at least one electronic control device; and generating a malfunction signal in the at least one electronic control device when the actual movement direction signal differs from the nominal movement direction signal by a predetermined amount wherein the malfunction signal indicates a malfunction of the electronic steering device, otherwise not generating the malfunction signal, wherein at least one safety measure is performed if the malfunction signal is generated, wherein the electric steering device is configured fully electric, wherein an electric steering actuator of the electric steering device exclusively drives the steered wheels of the vehicle according to a steering command, wherein the vehicle is braked to a stop by an operating brake when the safety measure is performed.

14. The method according to claim 13, wherein a parking brake is activated when the stop of the vehicle is detected.

* * * * *